US010674060B2

(12) United States Patent
Yuan

(10) Patent No.: US 10,674,060 B2
(45) Date of Patent: Jun. 2, 2020

(54) METHOD FOR CONTROLLING A MONITORING CAMERA

(71) Applicant: Axis AB, Lund (SE)

(72) Inventor: Song Yuan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/178,595

(22) Filed: Nov. 2, 2018

(65) Prior Publication Data

US 2019/0149714 A1 May 16, 2019

(30) Foreign Application Priority Data

Nov. 15, 2017 (EP) ..................................... 17201819

(51) Int. Cl.
*H04N 7/18* (2006.01)
*H04N 5/232* (2006.01)
*H04N 5/272* (2006.01)
*G08B 29/04* (2006.01)
*G08B 13/196* (2006.01)
*G08B 25/08* (2006.01)

(52) U.S. Cl.
CPC ... *H04N 5/23203* (2013.01); *G08B 13/19663* (2013.01); *G08B 13/19671* (2013.01); *G08B 13/19682* (2013.01); *G08B 25/08* (2013.01); *G08B 29/046* (2013.01); *H04N 5/272* (2013.01); *H04N 7/183* (2013.01); *H04N 7/188* (2013.01)

(58) Field of Classification Search
CPC combination set(s) only.
See application file for complete search history.

(56) References Cited

U.S. PATENT DOCUMENTS

| 8,610,730 | B1 | 12/2013 | Li et al. |
| 8,752,758 | B1 | 6/2014 | Klebe |
| 9,185,462 | B2 * | 11/2015 | Das .................... H04N 21/4722 |
| 2006/0155851 | A1 * | 7/2006 | Ma ........................ H04L 69/329 |
| | | | 709/226 |
| 2009/0294538 | A1 | 12/2009 | Wihlborg et al. |
| 2012/0154581 | A1 | 6/2012 | Wang et al. |
| 2014/0211018 | A1 | 7/2014 | de Lima et al. |

(Continued)

FOREIGN PATENT DOCUMENTS

| JP | 2008-229272 A | 10/2008 |
| KR | 10-2014-0036398 A | 3/2014 |

(Continued)

OTHER PUBLICATIONS

Maganis. G., et al., "Sensor Tricorder: What does that sensor know about me?," HotMobile 2011, Mar. 1-2, 2011, Phoenix, Arizona USA, Copyright 2011 ACM, pp. 1-6.

(Continued)

*Primary Examiner* — Clifford Hilaire
*Assistant Examiner* — Peet Dhillon
(74) *Attorney, Agent, or Firm* — Xsensus LLP

(57) ABSTRACT

The present invention relates to allowing control of a monitoring camera, typically outside of what is supported by a video management system, to which the camera is connected. The camera overlays a pattern on the video stream representing a link to an action in a control interface for controlling the camera and an operator uses an operator controlled device, such as a mobile phone, to scan the pattern and perform the action to control the camera.

11 Claims, 3 Drawing Sheets

(56) References Cited

U.S. PATENT DOCUMENTS

2015/0047024 A1* 2/2015 Park .................. G06Q 30/0645
                                                    726/19
2015/0181432 A1  6/2015 Casu et al.
2018/0131976 A1* 5/2018 Zabelin ............ H04N 21/23424

FOREIGN PATENT DOCUMENTS

KR    10-2014-0124289 A    10/2014
WO       2017/011814 A1     1/2017

OTHER PUBLICATIONS

Extended European Search Report and Opinion for European Application No. 17201819.4, dated May 22, 2018.
European Office Action dated Dec. 4, 2018, in European Application No. 17201819.4, 5 pages.
European Office Action dated Feb. 25, 2019, in European Application No. 17201819.4, 4 pages.
Communication Under Rule 71(3) EPC, Intention to Grant dated Jun. 12, 2019, in European Application No. 17201819.4 25 pages.

* cited by examiner

METHOD FOR CONTROLLING A MONITORING CAMERA

CROSS-REFERENCE TO RELATED APPLICATION

The present application claims priority to European Patent Application 17201819.4 filed by the European Patent Office on 15 Nov. 2017, the entire contents of which being incorporated herein by reference.

TECHNICAL FIELD OF THE INVENTION

The present invention relates to methods for controlling a monitoring camera, as well as a monitoring camera, and a monitoring system allowing control of such a monitoring camera.

BACKGROUND OF THE INVENTION

Video cameras capturing motion imagery are used in monitoring systems, surveillance systems, access control systems, etc. Such cameras are commonly connected to a Video Management. System (VMS), which allows an operator to organize, view and act upon monitoring, surveillance and access data, such as live video streams from the cameras that are connected to the VMS.

The cameras used for these purposes are often equipped with various sophisticated features such as electronic image stabilization (EIS), High Dynamic Range (HDR), automatic alarms for detected motion based on image analysis, as well as mechanical accessories in the form of wipers and similar. By properly utilising and adjusting such features when needed, the video from the camera will have better quality and be more useful to an operator of the VMS.

However, due to the vast number of camera brands and models that are available on the market and to which a VMS needs to be connectable, many such systems do not implement support for all features in all camera models, and, thus, the operator is often unable to properly control the camera through the interface provided by the VMS.

The camera features can sometimes be controlled through another interface, separate from the VMS, such as via a web page provided by a camera where the operator can login with credentials typically provided at the initial installation and configuration of the camera. However, that option is often perceived as cumbersome and is not used by the operator. In some cases, such login credentials might not even be available to a specific VMS operator. Hence, a simple and easily accessible way of controlling advanced features and settings of a monitoring camera is needed.

SUMMARY OF THE INVENTION

In view of the above, it is thus an object of the present invention is to provide a convenient way to enable more advanced control of a monitoring camera when the camera is connected to a video management system which might not provide support for all camera features.

In accordance with a first aspect of the invention, a method of controlling a camera monitoring a scene comprises the steps of:
the camera generating a link to an action in a control interface for controlling the camera.
the camera overlaying a pattern representing the link on a video stream captured by the camera.
an operator display displaying the video stream with the pattern,
an operator controlled device interpreting the pattern and accessing the link,
the operator controlled device performing the action in the control interface.

Using this method, the operator is provided with a possibility to, in a user-friendly and efficient manner, control functions of the camera, e.g. such functions and features that are not accessible or at least not readily accessible via the VMS. Typically, highly specialized or advanced camera functionality might not be supported by the VMS, and it is therefore advantageous that the camera may offer the opportunity to control such functionality despite the lack of support in the VMS.

Thus, using the method of the invention, the operator can send instructions directly to the camera, in effect bypassing the VMS. The operator may thereby perform such adjustments of settings that have been identified by the camera as potentially improving the usefulness of the video stream. Alternatively, adjustments of other features at the camera, or at devices connected to the camera may conveniently be performed in this manner. All of this can be achieved without the need to go through a separate and possibly cumbersome authentication procedure and without having to find the correct setting in an unfamiliar control interface.

It may be noted that the physical presence of the operator at the VMS display will implicitly provide the authentication for allowing this typically limited and specific control of the camera. As an alternative, if the operator controlled device is connected to the same WLAN as the camera, this fact may be used as an implicit authentication of the operator controlled device.

The operator controlled device may capture an image of the displayed pattern and interpret the captured image of the pattern. The operator controlled device may be in the form of a handheld device, such as a camera equipped mobile phone. The image may e.g., conveniently be captured or scanned via any commonly available mobile application for interpreting barcodes or QR codes, often denoted a QR code reader.

The link represented by the pattern may include a temporary session key permitting temporary access for performing the action in the web interface. This can be used to make sure that the action is only performed at such time when it is relevant to the camera, and not at a later point in time, when it might instead impair the functioning of camera. The temporary session key may set a limitation in the time frame during which the link may be accessed, or it may also set a limit to the link for a one-time use, e.g., through a counter, such that when the link has been accessed once, it will effectively expire, and any additional access of the link (after the first access) will not result in the action being performed.

The camera may detect an event and then determine that operator attention is needed to control the camera. The camera may generate the link and overlay the pattern on the video stream in response to the detection of the event. This gives a convenient opportunity for the camera to request operator input when something occurs at the camera and e.g., the quality of the video could be improved by operator input, typically in a situation when there is a lack of support for both requesting and receiving such input through the VMS.

The event may correspond to detection of vibration or movement of the camera. The vibration or movement may be detected by an image analyser of the camera, which uses images captured by the camera to determine that vibrations or other movement is occurring. The analysis may e.g., use comparisons with one or more earlier images, such as in the form of a background model. The detection of the vibration or movement may also be performed by a sensor, such as a gyro or an accelerometer. Such a sensor may be mounted at a housing of the camera, or on or inside the camera, such as close to an image sensor or a lens of the camera. The sensor may e.g., be a sensor also used in an image stabilization process.

When the camera has detected vibration or movement and determined that operator attention is needed, e.g., due to this vibration or movement being persistent, reoccurring, above a certain magnitude threshold or corresponding to a pattern indicating a tampering attempt, the action which is represented by the link may be to activate an image stabilization functionality in the camera or to conclude that a tampering attempt is being made and to activate a tampering deterring action, such as activating a speaker message at the camera. The speaker message could e.g., be pre-recorded.

The event may correspond to an image analyser of the camera detecting a reduction in image quality, a low light condition or an obstruction of the camera view. Again, the image analyser may perform this detection by comparing images captured by the camera with one or more previous images, such as in the form of a background model. As an alternative, the image analyser may perform this detection by determining image characteristics of captured images, e.g., by calculating certain values based on the images and comparing such values to expected or threshold values.

When the camera has detected an event corresponding to a reduction in image quality, a low light condition or an obstruction of the camera view, the action represented by the link may be to modify one or more imaging parameters, such as white balance, gain, exposure time, focus distance or turning on or off an High Dynamic Range, HDR, functionality. The action may also be to activate a cleaning or dirt removal mechanism at the camera, such as a wiper or a jet of pressurized air removing debris or dirt from the camera. Another option is to conclude that a tampering attempt is made and generate a link which represents the action to activate a tampering deterring action, such as activating a speaker message at the camera.

The event may correspond to a storage or bandwidth limitation being exceeded or close to exceeded. In that case, the action may correspond to changing one or more encoding parameters. As an example, the change in the encoding parameters may cause a compression level to be increased, such as by adapting QP parameters in order to reduce a size of the video stream. The change in encoding parameters may also e.g., cause a reduction in frame rate in the stored or transmitted video.

The event may correspond to an alarm, such as a motion detection alarm. The motion detection alarm may be caused by an image analyser of the camera analysing the images captured by the camera, e.g., by comparison to one or more previous images, such as in the form of a background model, and concluding that the motion currently present in the image justifies an alarm. The motion detection alarm may be triggered when the extent of motion, e.g., in the form of the amount of moving pixels in the current image, is larger than a threshold value, or when the motion occurs in a specified section (which could be static or dynamic, e.g., in the form of a detected object) of the monitored scene or fulfilling any other preset condition. The motion detection alarm may also be triggered by a sensor, such as a PIR sensor or a radar connected to the camera. The action which is represented by the link generated by the camera in response to the event may be to acknowledge or dismiss the alarm. As a convenient option, the camera may generate two links (and corresponding patterns), one for the action of dismissing the alarm, and one for the operator to acknowledge the alarm, and the operator may then select to scan the pattern that corresponds to the acknowledgement action or to the dismissal action. An explanatory text or symbol may be added next to each of the overlaid patterns to simplify the choice.

In accordance with a second aspect of the invention, a method of allowing control of a camera monitoring a scene is provided, comprising the steps of:

the camera generating a link to an action in a control interface for controlling the camera, the camera overlaying a pattern representing the link on a video stream captured by the camera.

In accordance with a third aspect of the invention, a camera arranged for monitoring a scene is provided, the camera comprising:

a connection to a control interface for allowing control of the camera, a video capturing unit arranged to capture a video stream depicting the scene, a video processing unit arranged to generate a link to an action in the control interface and overlay a pattern representing the link on the video stream, an output for transmitting the video stream with the pattern.

In accordance with a fourth aspect of the invention, a monitoring system is provided which comprises a camera according to the above, an operator display arranged to display the video stream with the pattern and an operator controlled device arranged to interpret the pattern to access the link and perform the action in the control interface.

The second, third and fourth aspect of the invention are associated with same advantages as described in relation to the first aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The operations of any method disclosed herein do not have to be performed in the exact order disclosed, unless explicitly stated. Furthermore, the word "comprising" does not exclude other elements or steps.

BRIEF DESCRIPTION OF THE DRAWINGS

The above disclosed and other aspects of the present invention will now be described in more detail, with reference to the appended drawings illustrating embodiments of the invention.

Further, in the figures like reference characters designate like or corresponding parts throughout the several figures. Note that figures are not to scale for purposes of clarity.

DETAILED DESCRIPTION OF EMBODIMENTS

Figure 1:
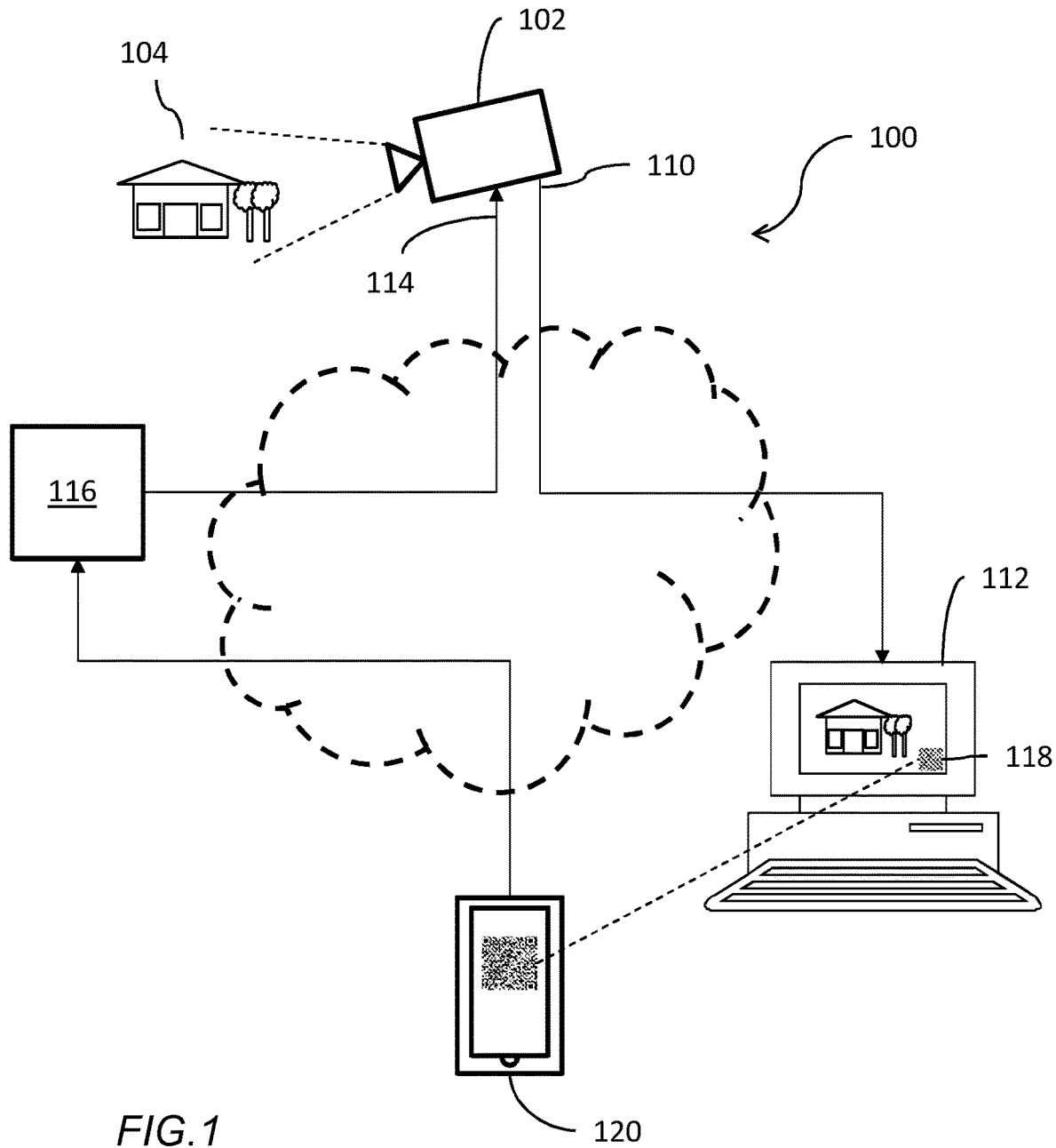
FIG. 1 shows a monitoring system.
Figure 2:
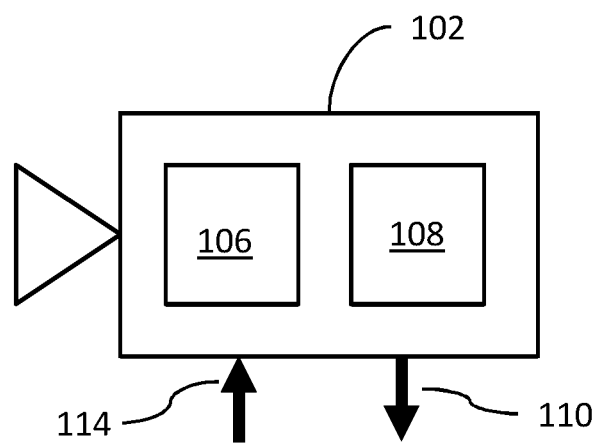
FIG. 2 shows a monitoring camera.

A monitoring system 100, as shown in FIG. 1, includes a camera 102 monitoring a scene 104. As illustrated in FIG. 2, the camera 102 comprises a video capturing unit 106, arranged to capture video of the monitored scene 104, and a video processing unit 108, arranged to perform various video processing activities, such as encoding the captured video stream in an appropriate format. An output 110 of the camera 102 transmits, directly or via a network, a video stream, which is viewed by a VMS operator on an operator display 112.

The camera 102 has a connection 114 to a control interface 116 where one or more features of the camera 102 may be controlled, typically including such camera features that are not controllable via a VMS interface provided to the operator at the operator display 112. It may be noted that the operator commonly has no means to access to the control interface 116 through the VMS interface accessible at the operator display 112. The control interface 116 can e.g., be provided by the camera or by a service center application, e.g., hosted in a cloud environment and to which the camera is connected, e.g., during a configuration and installation phase of the camera. The control interface may be in the form of a web interface, such as a web page provided by the camera or by the service center application.

To provide the operator with the option to control features at the camera 102, despite there being no support for such control in the VMS interface, the video processing unit 108 of the camera 102 is arranged to, e.g., in response to an event being detected at the camera 102, generate a link, typically a URL, to an action in the control interface 116. The video processing unit 108 will then prepare a representation of this link in the form of a pattern 118, typically a one- or two-dimensional graphical pattern, such as a QR code or a bar code, and overlay the pattern 118 on the video stream transmitted from the camera 102 and delivered to the operator display 112.

An operator controlled device 120, such as a mobile phone, may then be used to interpret the pattern 118 displayed at the operator display 112, perform the action in the control interface 116 and thereby control the camera 102. The operator controlled device 120 may e.g., use the mobile phone camera and a commonly available QR code scanning app to scan or capture the pattern and thereby extract the link represented by the pattern 118. A standard mobile web browser or other suitable application may be used to access the link.

Typically, the link will contain instructions or parameters for performing the action in the control interface 116, such that the access of the link performs the action without requiring any further interaction from the operator. In other words, when the link is accessed, such as via a browser provided by the operator controlled device, the action will automatically be performed and the browser will typically merely show an acknowledgement that the action has been performed. It would also be feasible that accessing the link would allow the operator to make a selection in the control interface 116, such as moving a slider or selecting one of a plurality of options in the control interface 116 for controlling a specific feature or functionality of the camera 102.

The link may include a temporary session key permitting temporary access for performing the action in the control interface 116. The operator controlled device 120 therefore does not have to be a trusted device or perform any login procedure since the access permission is contained in the link. Since the temporary session key means that the link is only valid for a limited time frame, or only valid the first time it is accessed, there is no risk that the link will be accessed at a later time when it is no longer relevant to the camera. E.g., taking a picture of the pattern and interpreting it at this later time would not have the effect of performing the action, due to the limitations set by the temporary session key.

Figure 3:
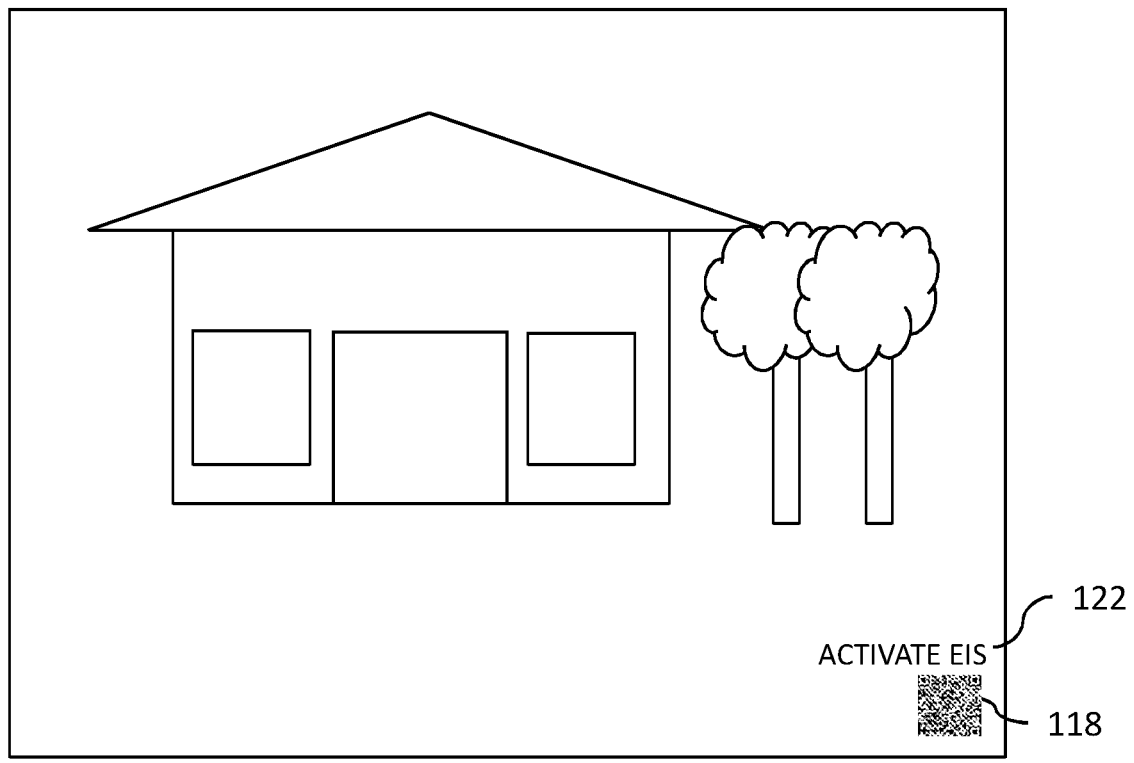
FIG. 3 shows an image generated by the monitoring camera.

It may be noted that several different patterns 118, representing different actions in the control interface 116, may be overlaid by the camera 102 at the same time in the video stream. As illustrated in FIG. 3, the camera processing unit 108 may overlay an explanatory text 122 or symbol next to the pattern 118, explaining to the operator the action that will be the result of accessing the link represented by the pattern 118. In FIG. 3, the text "Activate EIS" is overlaid next to the pattern 118.

As mentioned above, the camera 102 may generate the link and overlay the pattern 118 in response to detecting an event, where the camera concludes that operator attention might improve the functioning of the camera 102. Another option is that the camera generates a link representing the action and overlays the QR codes based on a time having elapsed, or based on a point in time being reached. Additionally, it would also be possible for the camera to include the QR code at all times, for certain functionalities that the camera in this way makes accessible to an operator.

One example of such an event is that the camera 102 determines that it might be advantageous if electronic image stabilization, EIS, would be turned on by the operator. This may be determined based on input from a sensor, such as a gyro or an accelerometer, detecting vibration or movement of the camera 102. The sensor may be placed on a camera housing or close to a lens or image sensor of the camera 102. The sensor might also be used in the image stabilization process, thus having a dual use.

The occurrence of such vibrations or movement may also be determined by an image analyser, which typically may be part of the image processing unit 108. The image analyser may e.g., determine that the entire image is moving in some manner which could indicate that it is actually the camera 102 itself that is moving or vibrating. The action in the control interface 116 would in these cases correspond to switching on EIS in the camera 102. Thus, when vibrations or movements is detected at the camera 102, the camera 102 generates a link, which will perform the action of turning on EIS in the camera 102 via the control interface 116, and overlays a pattern 118 representing this link. When the link is accessed by the operator controlled device 120, EIS is switched on by the camera 102, hopefully improving the quality of the images captured by the camera 102.

When EIS is turned on, the camera 102 may instead generate a link to the action of turning off EIS and overlay another pattern 118 representing this link to the video stream. When the operator then wishes to turn off EIS at the camera, e.g., due to the operator noting that the vibrations affecting the camera have stopped, the same procedure is used as when turning on EIS, i.e. the operator controlled device 120 is used to access the link by interpreting the pattern 118 and thereby EIS is switched off at the camera 102.

Another example related to the detection of vibration or movement may be that it is concluded that a tampering attempt is made, such as an attempt to hit the camera 102 with a heavy object, or to turn the camera 102 away from the scene 104. The action may then be to activate a tampering deterring action, such as activating a speaker message at the camera 102.

The event may also correspond to detection of a reduction in image quality, a low light condition, or that the camera view seems to be obstructed or covered. Such an event may be detected by the image analyser analysing the images captured by the camera 102. The corresponding action may in this case be to activate a cleaning functionality at the camera 102, such as a wiper or a jet of pressurized air. Alternatively, the action may be to activate a tampering deterring action, such as a speaker message at the camera 102.

As another option, the action may be to change one or more imaging parameters used by the image capturing unit 106 to capture the video stream, such as turning on (or off) an HDR functionality, switching the state of a day/night filter (IR filter), changing a setting for e.g., gain, white balance, exposure, focus, or performing a recalibration of the camera imaging settings.

Another example of an event may be that the camera 102 concludes or is notified that limits related to storage or bandwidth are exceeded or are close to being exceeded. The action may then be to change one or more video encoding parameters used by the camera for encoding the image stream at the video processing unit 108, in order to reduce the size of the video stream, e.g., by reducing the amount of video frames encoded per time period or by reducing the size of the video frames. The reduction in the video stream size may e.g., be accomplished by increasing a compression level or selecting a smart encoding option which requires less storage space and less transmission bandwidth.

According to another example, the event may be a motion detection alarm, typically caused by a motion detection algorithm detecting motion in the video stream captured by the camera 102. Such motion may be caused by a person or a vehicle of interest moving in the scene 104, but it may also be caused by a leaf blowing past close to the camera 102 or a spider moving on a cover glass in front of the camera lens. In the two latter cases, the motion detection alarm is not of interest, and the operator might want to indicate that this alarm should be ignored. The corresponding action performed may therefore be to dismiss the alarm, e.g., by automatically excluding it from a list of alarms provided by the camera 102, or by adding a tag stating that the alarm has been reviewed and is of no interest. The action may of course also be to acknowledge the alarm. The operator may then take appropriate action if needed.

Figure 4:
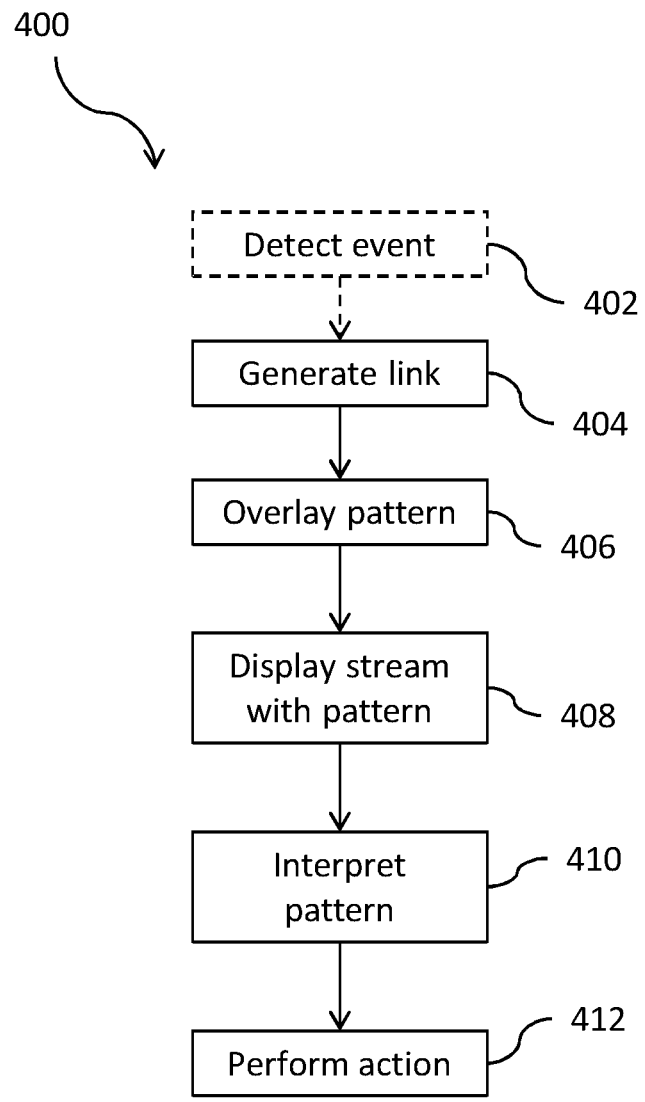
FIG. 4 is a flow chart of a method of controlling the monitoring camera.

FIG. 4 illustrates a method 400 according to embodiments of the invention. In step 404, the camera 102 generates the link to an action in the control interface 116. Step 404 may be preceded by step 402 where the camera 102 detects an event, and step 404 may be in response to this detection. In step 406 the link is then overlaid on the captured video stream in the form of a pattern 118 representing the link. In step 408, the video stream with the overlaid pattern 118 is displayed on an operator display 112 and in step 410 the pattern 118 is interpreted by an operator controlled device 120.

The accessing of the link, as a result of this interpretation by the operator controlled device 120, will lead to the desired action being performed in step 412, either completely automatically, such that the operator simply receive, typically on his device 120, an acknowledgement that the action has been performed by the control interface 116 controlling the camera 102, or by the operator interacting with the control interface 116 through the operator controlled device 120, such as by making a selection in the interface by checking a box or moving a slider, which in turn causes the control interface 116 to control the camera 102 accordingly.

In summary, the present invention relates to allowing control of a monitoring camera, typically outside of what is supported by a VMS to which the camera is connected. The camera overlays a pattern on the video stream representing a link to an action in a control interface for controlling the camera and an operator uses an operator controlled device, such as a mobile phone, to scan the pattern and perform the action to control the camera.

The person skilled in the art realizes that the present invention is by no means limited to the embodiments described above. On the contrary, modification and variation are possible within the scope of the appended claims. As one example, the various units described above may be implemented in hardware or in software, or in a combination thereof.

The invention claimed is:

1. A method of controlling a camera monitoring a scene, comprising
    the camera generating a link to an action in a control interface for controlling the camera,
    the camera overlaying a pattern representing the link on a live video stream captured by the camera,
    an operator display displaying the live video stream with the pattern,
    an operator controlled handheld device, separated from the operator display, capturing an image of the pattern displayed on the operator display,
    the operator controlled handheld device interpreting the captured image of the pattern and accessing the link, thereby performing the action in the control interface and controlling the camera; and
    the camera detecting an event and determining that operator attention is needed to control the camera and wherein the camera performs the generating the link and overlaying the pattern on the live video stream in response to detecting the event.

2. The method of claim 1, wherein the link represented by the patter further includes a temporary session key permitting temporary access for performing the action in the control interface.

3. The method of claim 1, wherein the event corresponds to detecting vibration or movement of the camera by at least one of an image analyzer of the camera or a sensor, such as a gyro or an accelerometer.

4. The method of claim 3, wherein the action comprises at least one of:
    activating an image stabilizing functionality in the camera, or concluding that a tampering attempt is made and activating a tampering deterring action, such as activating a speaker message at the camera.

5. The method of claim 1, wherein the event corresponds to an image analyzer of the camera detecting at least one of: a reduction in image quality, a low light condition or an obstruction of a camera view.

6. The method of claim 5, wherein the action corresponds to at least one of: modifying one or more imaging parameters, activating a cleaning functionality at the camera, or concluding that a tampering attempt is made and activating a tampering deterring action, such as activating a speaker message at the camera.

7. The method of claim 1, wherein the event corresponds to a storage or bandwidth limitation being exceeded or close to exceeded.

8. The method of claim 7, wherein the action corresponds to changing encoding parameters, such as increasing a video compression level.

9. The method of claim 1, wherein the event corresponds to an alarm, such as a motion detection alarm.

10. The method of claim 9, wherein the action corresponds to an acknowledgement or a dismissal of the alarm.

11. A monitoring system, comprising:
a camera arranged for monitoring a scene, including
- a connection to a control interface for allowing control of the camera;
- video capturing circuitry configured to capture a live video stream depicting the scene;
- video processing circuitry configured to generate a link to an action in the control interface and overlay a pattern representing the link on the live video stream;
- an output for transmitting the live video stream with the pattern, and an operator display to display the live video stream with the pattern; and
- detecting circuitry configured to detect an event and determine that operator attention is needed to control the camera and wherein the camera performs the generating of the link and the overlaying of the pattern on the live video stream in response.

* * * * *